United States Patent [19]

Ruckes et al.

[11] Patent Number: 4,843,108

[45] Date of Patent: * Jun. 27, 1989

[54] PROCESS FOR THE PRODUCTION OF POLYAMINES

[75] Inventors: Andreas Ruckes, Leverkusen; Werner Rasshofer, Colonge; Klaus König, Odenthal; Richard Kopp, Colonge, all of Fed. Rep. of Germany

[73] Assignee: Bayer Aktiengesellschaft, Bayerwerk, Fed. Rep. of Germany

[*] Notice: The portion of the term of this patent subsequent to Jun. 27, 2006 has been disclaimed.

[21] Appl. No.: 173,350

[22] Filed: Mar. 24, 1988

[30] Foreign Application Priority Data

Mar. 28, 1987 [DE] Fed. Rep. of Germany ....... 3710426

[51] Int. Cl.$^4$ .............................................. C08G 18/14
[52] U.S. Cl. ..................................... 521/155; 528/44; 528/48; 528/52; 528/57; 564/305; 564/395; 564/414; 564/444
[58] Field of Search .................. 521/155, 163; 528/44, 528/48, 52, 57, 59; 564/305, 395, 414, 444, 445

[56] References Cited

U.S. PATENT DOCUMENTS

| | | | |
|---|---|---|---|
| 4,386,218 | 5/1983 | Rasshofer et al. | 564/38 |
| 4,515,923 | 5/1985 | Fauss et al. | 525/127 |
| 4,540,720 | 9/1985 | Rasshofer et al. | 521/159 |
| 4,565,645 | 1/1986 | Rasshofer et al. | 252/182 |

FOREIGN PATENT DOCUMENTS

| | | |
|---|---|---|
| 2948419 | 8/1981 | Fed. Rep. of Germany . |
| 3223400 | 6/1982 | Fed. Rep. of Germany . |
| 3437632 | 4/1986 | Fed. Rep. of Germany . |

OTHER PUBLICATIONS

The Organic Chemistry of Nitrogen, by N. V. Sidgwick, Clarendon Press, Oxford, p. 236, 1966.
The Organic Chemistry of Nitrogen, by N. V. Sidgwick, Clarendon Press, Oxford, p. 326, 1966.
Advanced Organic Chemistry: Reactions, Mechanisms, and Structure, by J. March, McGraw Hill, p. 658, 1968.

*Primary Examiner*—Maurice J. Welsh
*Attorney, Agent, or Firm*—Gene Harsh; Joseph C. Gil; Richard E. L. Henderson

[57] ABSTRACT

Polyamines are produced by hydrolyzing isocyanate compounds having an NCO content of from 0.5 to 40 wt. % with from 0.75 to 40 moles of water per equivalent of NCO groups in the presence of from 0.021 to 0.099 wt. % sodium hydroxide and at least 10 wt. % water-miscible polar organic solvent containing nitrile, ketone, sulfoxide or ether groups having a boiling point of from 56° to 250° C. The reaction mixture is maintained in a homogeneous phase. The reaction is carried out at 40° to 170° C. These polyamines are useful in the production of polyurethane(urea)s.

9 Claims, No Drawings

PROCESS FOR THE PRODUCTION OF POLYAMINES

BACKGROUND OF THE INVENTION

This invention relates to a one-step process for the production of polyamines containing primary amino groups, preferably aromatically bound amino groups and to a process for producing a polyurethane(urea) therefrom.

It is known that isocyanates can be converted into amines by acidic or basic hydrolysis, as shown for example in N.V. Sidgwick, The Organic Chemistry of Nitrogen, Clarendon Press, Oxford, page 236 (1966) and in J. March, Advanced Organic Chemistry: Reactions, Mechanism and Structure, McGraw-Hill Book Co., N.Y. page 658 (1968). Sidgwick refers generally to the alkaline hydrolyzability of NCO groups without, however being specific.

Multi-step processes and one-step processes for converting isocyanates to amines have been proposed. For example, DE-A-2,948,419, DE-AS 3,039,600 and DE-OS No. 3,131,252 each disclose a multi-step process. DE-OS No. 3,223,400/EP-97 299, DE-OS No. 3,223,398/EP-97 298 and DE-OS 3,223,397/EP-97 290 each disclose a one-step process. The one-step hydrolysis processes use "ether solvents" together with tertiary amines as catalysts (DE-OS No. 3,223,400), polar solvents (such as dimethylformamide) together with tertiary amines or relatively large quantities of alkali hydroxides, alkali silicates or alkali cyanides as catalysts (DE-OS No. 3,223,398) or polar solvents with carbonates or carboxylates as catalysts (DE-OS No. 3,223,397).

All of the known processes for the production of polyamines are complicated to a greater or lesser extent. Even in the one-step processes, further simplifications which would enable the polyamines to be obtained in an economically even more favorable manner, in even better NCO/NH$_2$ conversion rates (i.e. higher NH$_2$ numbers) and in an even smoother reaction would be desirable. More specifically, a process in which
 (a) no filtration is necessary,
 (b) there is no need for a tertiary amine catalyst to be separated off by distillation,
 (c) the quantity of catalyst required may be drastically reduced so that the catalyst may remain in the polyamine,
 (d) the conversion of NCO groups into NH$_2$ groups is substantially quantitative (high NCO/NH$_2$ conversion rate, i.e. a high amine number approaching the theoretical value),
 (e) the proportion of monomeric amines is as small as possible,
 (f) there is no accumulation of secondary products requiring disposal and
 (g) the polyamines and auxiliaries may be worked up without difficulty
would represent a significant advance over known processes.

It has now surprisingly been found that these and other improvements may be obtained when the one-step hydrolysis of polyisocyanates to polyamines is carried out at certain water/NCO ratios, using certain water-soluble organic solvents and minimal quantities of catalyst under homogeneous reaction conditions. Under these conditions, it is even possible to carry out the hydrolysis at low temperatures.

DETAILED DESCRIPTION OF THE INVENTION

A considerable advantage of the process of the present invention is the small quantity of catalyst required. No catalyst or reaction products of the CO$_2$ formed with the catalyst (such as NaHCO$_3$ and Na$_2$CO$_3$) have to be filtered off.

The catalyst used in the practice of the present invention is readily soluble in the reaction medium. There are therefore no distribution disequilibria as there are where rapidly sedimenting alkali carbonates or hydrogen carbonates are used (DE-OS No. 3,223,397).

Due to the very small quantities in which it is used, the catalyst may safely remain in the end product.

In addition, the process of the present invention is also suitable for the hydrolysis of NCO prepolymers based on polyesters because the moderate reaction conditions do not lead to cleavage of the ester groups.

NCO prepolymers (preferably obtained by reaction of aromatic diisocyanates such as tolylene diisocyanate with polyester polyols or polyether polyols containing two or more hydroxyl groups) are preferably used in the hydrolysis of the present invention. Such NCO prepolymers generally contain a certain proportion of monomeric, low molecular weight polyisocyanates which are converted into monomeric, low molecular weight amines (for example 2,4-tolylenediamine (TDA) during the production of the relatively high molecular weight amino compounds. The present invention provides a hydrolysis process in which the end products contain a very low proportion of low molecular weight diamines or polyamines. It is desirable to reduce the proportion of monomeric amines in the relatively high molecular weight aminopolyethers or aminopolyesters as much as possible in order to minimize any physiological risks, to eliminate the known adverse effect of free aromatic low molecular weight amines on the stability to light and discoloration of aminopolyethers or aminopolyesters and of the PU plastics produced therewith and to obtain PU plastics having reproducible properties.

One way of keeping the content of monomeric amine (for example of TDA) in the high molecular weight polyamines at a very low level is to reduce the content of monomeric, low molecular weight isocyanate (for example TDI) in the corresponding NCO prepolymers before hydrolysis by distillation using a thin-layer evaporator. This procedure is expensive and complicated.

Another way of obtaining an end product containing a low proportion of low molecular weight amine would be to use a subequivalent quantity of diisocyanate, based on an "ideal" NCO prepolymer (NCO:OH ratio 2:1), in the production of the prepolymer. The disadvantage of this approach would be that both the NCO prepolymer and also the end product would have increased viscosities.

According to DOS No. 3,437,632, the content of monomeric, low molecular weight amines is reduced by selective reaction with mono-, di- and/or polyisocyanates (for example propyl-isocyanates). Once again, however, a considerable increase in viscosity has to be accepted.

DOS No. 3,223,397 recommends the use of small quantities of an "H-active" compound in the production of the NCO prepolymers. However, a considerable increase in viscosity is also observed in the end product.

It has now surprisingly been found that, even where a 2:1 NCO prepolymer is used, the content of low molecular weight amines in the polyamines obtained by the process of the present invention is considerably lower ($\leq 0.6\%$ weight %) than was to be expected from the content of free monomeric isocyanates (approx. $\geq 1$ wt. %) in the starting compound. The hydrolysis process according to the invention gives polyamines having a very low content of free monomeric amine without any need for thin-layer distillation or for the addition of isocyanate or the like (as in DOS No. 3,437,632) beforehand.

The present invention relates to a one-step process for the production of preferably relatively high molecular weight polyamines containing primary amino groups by hydrolysis of compounds containing NCO groups in water-containing organic solvents in the presence of basic catalysts. More specifically, compounds containing NCO groups (preferably aromatically bound NCO groups) with an NCO group content of from 0.5 to 40 wt. %, preferably NCO prepolymers with an NCO content of from 1.2 to 25 wt. % or modified polyisocyanates with an NCO content of from 1.5 to 20.5 wt. % are hydrolyzed at 40° to 170° C. (preferably at 50° to 130° C.) with from 0.75 to 40 (preferably from 1.5 to 10) moles water per equivalent of NCO in the presence of from 0.021 to 0.099 wt. % (preferably from 0.03 to 0.099 wt. %), based on 100 wt. % of isocyanate, of sodium hydroxide as basic catalyst in the presence of $\leq 10$ wt. % (preferably from 20 to 2000 wt. % and more preferably from 40 to 1000 wt. %), based on 100 wt. % of isocyanate of a water-miscible, polar organic solvent containing nitrile, ketone, sulfoxide or ether groups and having a boiling range of from 56° to 250° C. while maintaining a homogeneous reaction phase.

The present invention also relates to processes for the production of optionally cellular polyurethane (urea)s by reaction of the polyamines obtained in accordance with the present invention with polyisocyanates, optionally other compounds containing isocyanate-reactive groups, optionally in the presence of known auxiliaries, additives and/or solvents.

The NCO compounds containing two or more aromatic or heterocyclic (preferably aromatic) NCO groups suitable for use in the process of the present invention (herein referred to as "NCO compounds") include: modified polyisocyanates of the type formed by partial conversion of the isocyanate groups into urethane, urea, biuret, uret dione, isocyanurate and/or uretone imine groups, so-called "NCO prepolymers" of polyfunctional compounds containing NCO-reactive H-groups and having a molecular weight of from 62 to 12000 (preferably of from 400 to 6000) and (excess) quantities of aromatic polyisocyanates or (less preferably) semi-prepolymers of NCO prepolymers and additional low molecular weight polyisocyanates.

Examples of isocyanates suitable as modified aromatic polyisocyanates include: polyisocyanates containing urethane groups (formed by modification with low molecular weight polyols); polyisocyanates containing urea groups (for example, through modification with water, DE-PS No. 1,230,778); polyisocyanates containing biuret groups (U.S. Pat. No. 3,124,605, 3,201,372, GB No. 889,050); polyisocyanates containing isocyanurate groups (DE-PS No. 1,022,789 and 1,222,067) and dimeric or oligomeric polyisocyanates containing uret dione or uretone imine groups. These compounds are known compounds or may be obtained by known methods. Several uret dione polyisocyanates are mentioned in Analytical Chemistry of the Polyurethanes, Vol. 16/III, High Polymers Series (Wiley 1969).

Modified polyisocyanates containing urethane and/or urea and/or biuret and/or uret dione and/or isocyanurate and/or uretone imine groups which may be used in the process according to the invention generally have an NCO content of from 1.5 to 20.5 wt. % (preferably from 5 to 20.5 wt. %). Polyisocyanates containing urethane groups (through modification with low molecular weight (molecular weights 62 to 399) diols and/or polyols) having NCO contents of from 1.5 to 20.5 wt. % preferably from 5 to 20.5 wt. % are particularly preferred.

The NCO compounds used in the process of the present invention are most preferably NCO prepolymers obtained in known manner by reaction of low molecular weight and/or relatively high molecular weight compounds containing hydroxy and/or amino and/or thiol groups as reactive groups (molecular weight 62 to around 12,000) with an excess of polyisocyanate.

Suitable polyisocyanates for the preparation of the compounds containing free NCO groups include, in principle, any aromatic and heterocyclic di- and polyisocyanates of the type described, for example, by W. Siefken in Justus Liebigs Annalen der Chemie, 562, pages 75 to 136 (1949), or on pages 15 to 25 of DE-OS No. 3,223,400 or known in the prior art.

Low molecular weight and/or relatively high molecular weight compounds containing hydroxyl and/or amino and/or thiol groups as reactive groups (molecular weight range 32 and 60–12,000) are suitable for production of prepolymers from such isocyanates.

Preferred NCO prepolymers are obtained from relatively high molecular weight polyols (molar mass 400–12,000) by reaction with aromatic diisocyanates, optionally using known chain-extending agents (molar mass 62–399), in an equivalent ratio of from 1:1.5 to 1:2.8 and more especially in an equivalent ratio of from about 1:1.5 to 1:2.

The NCO content of the NCO prepolymers (preferably containing urethane groups) should be from 0.5 to 40 wt.%, preferably from 1.2 to 25 wt. % and more preferably from 1.5 to 10 wt. % for functionalities of from 2 to 8, preferably from 2 to 4 and more preferably from 2 to 3.

However, so-called "semiprepolymers", i.e. mixtures of NCO prepolymers or modified polyisocyanates with other free polyisocyanates, may also be used in the process of the present invention.

Water, preferably in liquid form, is used as a reaction components. At least 0.75 mole, preferably 0.75 to 40 moles and more preferably 1.5 to 10 moles water are used per equivalent of NCO.

The solvent component is a water-miscible, polar organic solvent containing nitrile, ketone, sulfoxide or ether groups having a boiling range of from 56° to 250° C. Aliphatic $C_2$–$C_{10}$ nitriles, aliphatic $C_2$–$C_{10}$ ketones and/or aliphatic $C_2$–$C_{10}$ sulfoxides or dioxanes are preferred.

Acetonitrile, acetone, methylisopropylketone and/or dimethylsulfoxide are particularly preferred. The solvents may even be used in admixture in any ratios with one another.

The following boundary conditions apply to the quantities (particularly the upper limits) of the solvent to be used:

1. The hydrolysis reaction mixture should contain from 20 to 2000 and preferably from 40 to 1000 wt. % solvent based on 100 wt. % of NCO compound. 2. Water and, optionally, solvent should be used in a quantity such that a substantially homogeneous (at most slightly cloudy) or preferably a homogeneous, clear solution containing the NCO compound is formed at the reaction temperatures. It is particularly preferred to add a quantity of water such that a mixtured comprising a single phase at all process temperatures is formed, but always maintaining the above-mentioned ratio of water to NCO component.

The catalytically active compounds are generally added to the solvents and the water. Addition to the compound containing isocyanate groups is possible in some cases, but not preferred.

To hydrolyze the NCO compound to polyamines having a sufficiently high amine number (high conversion rate), it is advisable to maintain a concentration of the NCO compound of $\leq 75$ wt. % and preferably of $\leq 55$ wt. % in the reaction mixture.

The reaction according to the invention is preferably carried out in homogeneous phase. If the water or the NCO compound is slightly overdosed, slight clouding of the reaction mixture may be temporarily obtained because the starting materials are no longer completely dissolved.

However, sufficient water must be present to homogeneously dissolve the quantity of catalyst used.

The reaction may be carried out at temperatures of from 40° to 170° C., although it is preferably carried out at temperatures of from 50° to 130° C. because at such temperatures the best volume/time yields are obtained in conjunction with high solubility and, surprisingly, minimal extension of the urea. In certain circumstances, it may be necessary to carry out the reaction under pressure to enable the necessary temperatures to be reached.

It is also important to ensure that the less polar and/or the less soluble in water the particular solvent used is, the greater the degree of dilution and/or quantity of catalyst and/or temperature (optionally reachable through increased pressure) selected should be to reach high NCO/NH$_2$ conversion rates.

Where the quantity of catalyst is increased, it may also be necessary to increase the quantity of water used to guarantee complete dissolution of the catalyst in the reaction mixture.

It is possible by conducting a few preliminary tests to determine the optimal mixing ratios for specific starting compounds in order to obtain homogeneous mixtures taking into account the required ratios between isocyanate, water, sodium hydroxide and solvent.

The onset of the reaction is indicated by the almost spontaneous elimination of CO$_2$ which may even be observed at low temperatures, for example 10° C. However, it is considerably more favorable to work at the higher temperatures indicated in order to suppress the formation of urea. It is important that provision be made for very thorough and rapid mixing. Homogeneous dissolution of the reactants is largely ensured through the use of solvents. The reduction in viscosity where relatively high reaction temperatures are applied has a similar effect. The reaction may be carried out continuously or in batches.

The disclosure of DE-OS No. 3,223,397, page 32, line 20 to page 35, line 10, applies both to the continuous procedure and to the batch procedure.

The reaction mixture may also be worked up continuously or in batches using known methods, such as extraction, phase separation or distillation.

The reaction mixture is preferably worked up without phase separation by distilling off the solvent or the solvent/water mixture in vacuo at, for example, from 1 to 700 Torr, on completion of the reaction (no further evolution of CO$_2$). A higher vacuum, for example of 0.001 to 1 Torr, may be applied to remove more volatile residues. A temperature range of initially around 60° to 100° C. and subsequently of 80° to 100° C. has proved to be effective. The solvent distilled off may be reused, optionally several times.

The polyamines obtained by the present invention after working up are generally colorless to faintly colored, medium-viscosity to high-viscosity and, optionally, relatively high-melting products. They have a low vapor pressure. Depending upon the materials from which they were produced, these polyamines may also contain urethane and/or urea and/or uret dione and/or isocyanurate and/or biuret groups and/or uretone imine groups and, optionally, ether and/or acetal and/or carbonate and/or ester and/or thioether and/or dialkyl siloxane groups and/or the residues of polybutadienes which had already been present in the NCO compounds. However, additional bonds may also be formed through secondary reactions. For example, urea groups may form from already hydrolyzed components and NCO groups still remaining during the hydrolysis reaction.

The quantity of primary aromatic amino groups present in the polyamines corresponds at most to the quantity of NCO groups in the NCO compounds, i.e. approximately 0.19 to 15.23 wt. % NH$_2$ (for 0.5 to 40 wt. % NCO), preferably from 0.46 to 9.52 wt. % NH$_2$ (for 1.2 to 25 wt. % NCO) and more preferably from 0.58 to 3.8 wt. % NH$_2$ (for 1.5 to 10 wt. % NCO).

The preferably aromatic polyamines obtained in accordance with the invention may be used as reactants for optionally blocked polyisocyanates in the production of polyurethanes (polyurethane ureas), optionally cellular polyurethane plastics or polyurethane foams. They may even be used in combination with other low molecular weight (molecular weight 32 to 399) and/or relatively high molecular weight (molecular weight 400 to around 12,000) compounds containing isocyanate-reactive groups to produce such polyurethanes. Suitable starting components for the production of polyurethane plastics by known methods are mentioned above in connection with the production of the prepolymers and also in DE-A No. 2,302,564; 2,432,764 (U.S. Pat. Nos. 3,903,679) 2,639,083, 2,512,385, 2,513,815, 2,550,796, 2,550,797, 2,550,833, 2,550,860 and 2,550,862. This literature also contains references to auxiliaries and additives which may optionally be used in the production of polyurethanes.

The present invention also relates to processes for the production of polyurethane(urea)s using the polyamines obtained in accordance with the present invention. It is possible to produce elastomers, coatings and filaments from melts, solutions, dispersions or mixtures of reactive components from these polyamines. The polyamines may also be used as coupling components for diazo dyes, as hardeners for epoxy and phenolic resins and as components in any other known reactions involving amines, such as amidation or imidation.

The invention is further illustrated but is not intended to be limited by the following examples in which all parts and percentages are by weight unless otherwise specified.

EXAMPLES

EXAMPLE 1

The NCO prepolymer used (NCO content 3.6%) was prepared by stirring a mixture of a polyether (trimethylol propane←—propylene oxide) having an OH number of 56 and 2,4-tolylene diisocyanate in an NCO:OH equivalent ratio of 2:1 for 3 hours at 80° C.

A mixture of 2000 g acetonitrile, 60 g of water (acetonitrile:water ratio 33.3:1; 7.8 moles water per NCO equivalent) and 0.49 g NaOH (0.098 wt. %, based on NCO prepolymer) was initially introduced and heated to the reflux temperature. 500 g of the prepolymer were added over a period of 15 minutes.

On completion of the addition, the mixture was stirred for 5 minutes (rapidly abating evolution of $CO_2$), after which acetonitrile and water were distilled off by applying vacuum first (19.5 mbar, then 0.13 mbar at 80° to 100° C). NH number ($HClO_4$): 47.03 mg KOH/g.

EXAMPLE 2

A mixture of 2000 g of acetonitrile, 40 g of water (acetonitrile:water ratio 50:1, 5.1 moles water per NCO equivalent) and 0.3 g of NaOH (0.06 wt. %, based on NCO prepolymer) was initially introduced and heated to the reflux temperature. 500 g of the prepolymer of Example 1 (NCO content 3.6%) were added over a period of 15 minutes. The reaction mixture was worked up in the same way as in Example 1. NH number ($HClO_4$): 46.99 mg KOH/g.

EXAMPLE 3

A mixture of 2000 g of acetonitrile, 40 g of water (acetonitrile:water ratio 50:1; 5.1 moles water per NCO equivalent) and 0.2 g NaOH (0.04 wt. %, based on NCO prepolymer) was initially introduced and heated to the reflux temperature. 500 g of the prepolymer of Example 1 (NCO content 3.6%) were then added over a period of 15 minutes. The reaction mixture was worked up in the same way as in Example 1.
NH number ($HClO_4$): 45.34 mg KOH/g.

EXAMPLE 4

A mixture of 1000 g of acetonitrile, 40 g of water (acetonitrile:water ratio 25:1; 5.1 moles water per NCO equivalent) and 0.2 g NaOH (0.04 wt. %, based on NCO prepolymer) was initially introduced and heated to the reflux temperature. 500 g of the prepolymer of Example 1 (NCO content 3.6%) were added over a period of 15 minutes. The reaction mixture was worked up in the same way as in Example 1.
NH number ($HClO_4$): 43.15 mg KOH/g.

EXAMPLE 5

A mixture of 1370 g of acetonitrile, 40 g of water (acetonitrile:water ratio 34.2:1; 5.1 moles water per NCO equivalent) and 0.3 g NaOH (0.06 wt.%, based on NCO prepolymer) was initially introduced and heated to the reflux temperature. 500 g of the prepolymer of Example 1 (NCO content 3.6%) were then added over a period of 15 minutes. The reaction mixture was worked up to the same way as in Example 1.
NH number ($HClO_4$): 43.26 mg KOH/g.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A one-step process for the production of a polyamine containing primary amino groups comprising hydrolyzing
   (a) a compound containing NCO groups having an NCO content of 0.5 to 40 wt. % with
   (b) from 0.75 to 40 moles water per equivalent of NCO in component (a), in the presence of
   (c) from 0.021 to 0.099 wt. %, based on 100 wt. % of component (a) of sodium hydroxide and
   (d) $\geq 10$ wt. %, based on 100 wt. % of component (a) of a water-miscible, polar organic solvent containing nitrile, ketone, sulfoxide or ether groups and having a boiling point within the range of from 56 to 250° C. in a homogeneous reaction phase at 40° to 170° C.

2. The process of claim 1 in which component (b) is used in a quantity of from 1.5 to 10 moles.

3. The process of claim 1 in which sodium hydroxide is used in a quantity of from 0.03 to 0.099 wt. %.

4. The process of claim 1 in which component (d) is used in a quantity of from 40 to 1000 wt. %.

5. The process of claim 1 in which acetone, acetonitrile, methylisopropylketone, dimethylsulfoxide or a mixture thereof is used as component (d).

6. The process of claim 1 in which component (a) contains aromatically bound NCO groups.

7. The process of claim 1 in which component (a) is an NCO prepolymer having an NCO content of from 1.2 to 25 wt. %.

8. The process of claim 1 in which component (a) is a modified polyisocyanate having an NCO content of from 1.5 to 20.5 wt. %.

9. A process for the production of optionally cellular polyurethane(urea)s comprising reacting the polyamine of claim 1 with a polyisocyanate and optionally other compounds containing isocyanate-reactive groups.

* * * * *